United States Patent
Kato et al.

[11] Patent Number: 6,070,059
[45] Date of Patent: *May 30, 2000

[54] HIGH-FREQUENCY SWITCH

[75] Inventors: Mitsuhide Kato, Shiga-ken; Norio Nakajima, Takatsuki; Koji Tanaka, Shiga-ken, all of Japan

[73] Assignee: Murata Manufacturing Co., Ltd., Japan

[*] Notice: This patent is subject to a terminal disclaimer.

[21] Appl. No.: 08/760,690

[22] Filed: Dec. 4, 1996

[30] Foreign Application Priority Data

Dec. 5, 1995 [JP] Japan .................................... 7-316722

[51] Int. Cl.$^7$ ................................ H01P 5/18; H01P 1/10; H04B 1/46
[52] U.S. Cl. ............................ 455/78; 455/83; 333/101; 333/103; 333/104
[58] Field of Search ..................................... 333/101, 103, 333/104; 307/129, 112, 125, 87; 455/78, 81, 80, 415; 385/16, 17, 40

[56] References Cited

U.S. PATENT DOCUMENTS

| | | | |
|---|---|---|---|
| 3,069,629 | 12/1962 | Wolff | 328/92 |
| 4,539,535 | 9/1985 | Miller et al. | 333/164 |
| 5,103,195 | 4/1992 | Dunsmore | 333/103 |
| 5,642,083 | 6/1997 | Kato et al. | 333/103 |
| 5,699,023 | 12/1997 | Tanaka et al. | 455/78 |
| 5,742,212 | 4/1998 | Kato et al. | 455/83 |
| 5,748,054 | 5/1998 | Tonegawa et al. | 455/78 |

*Primary Examiner*—Edward F. Urban
*Assistant Examiner*—Sheila B. Smith
*Attorney, Agent, or Firm*—Ostrolenk, Faber, Gerb & Soffen, LLP

[57] ABSTRACT

A high-frequency switch in which insertion losses can be reduced and a wiring pattern for supplying control voltages can be simplified. The high-frequency switch has first through fourth ports. A transmission line is connected between each pair of the ports, thereby connecting the pairs of ports to each other. A respective capacitor is coupled between each of the ports and a corresponding one of the nodes between the respective transmission lines. A diode is connected between each of said nodes and a reference potential. A capacitor is coupled between the reference potential and each of the diodes. First through fourth control voltage terminals are connected to respective nodes between each of the diodes and the corresponding capacitors.

7 Claims, 6 Drawing Sheets

HIGH-FREQUENCY SWITCH

BACKGROUND OF THE INVENTION

1. Field of the Invention

The present invention relates to a high-frequency switch for changing between signal paths in a high-frequency circuit of, for example, a mobile cellular telephone. More particularly, the invention relates to a high-frequency switch having four ports and using transmission lines.

2. Description of the Related Art

In some mobile cellular telephones, either two antennas or one antenna and an external connecting terminal are for the common use in the transmitting circuit and the receiving circuit. In this type of telephone constructed as described above, a switch circuit shown in FIG. 7, for example, is conventionally used.

A switch circuit generally designated by 51 is constructed by connecting two three-port switches 52 and 53 to each other. The switch 52 has first, second and third ports P21, P22 and P23, while the switch 53 has first, second and third ports P31, P32 and P33. The second port P22 of the switch 52 is coupled to an antenna ANT, and the third port P23 is used as an external connecting terminal EXT. The third port P23 may, for example, receive a predetermined signal from the terminal EXT in order to measure the electrical characteristics of the receiving circuit of a mobile cellular telephone having this built-in switch circuit 51. Further, a second antenna may be connected to the third port P23. Namely, in a vehicle-mounted cellular telephone, a vehicle-mounted antenna may be connected to this circuit 51 as the second antenna.

In the switch 52, the first port P21 is adapted to be connected either to the second port P22 or to the third port P23. The first port P21 of the switch 52 is coupled to the first port P31 of the switch 53. The first port P31 of the switch 53 is adapted to be connected either to the second port P32 or to the third port P33. The second port P32 is connected to a transmitting circuit Tx, while the third port P33 is coupled to a receiving circuit Rx.

The switch circuit 51 constructed as described above can be used to connect either the antenna ANT or the external terminal EXT to the transmitting circuit Tx or the receiving circuit Rx.

As a component for providing each of the above-described three port switches 52 and 53, a high-frequency switch using diodes illustrated in FIG. 8 is known. A high-frequency switch generally designated by 61 has first through third ports P61 through P63 corresponding to the first through third ports P21 through P23 and P31 through P33 of the afore-described respective switches 52 and 53. The first port P61 is connected to the cathode of a diode 65a through a capacitor 64. The anode of the diode 65a is coupled to the second port-P62 through a capacitor 66a. Further, a transmission line 67a is connected at one end to the node between the anode of the diode 65a and the capacitor 66a. The transmission line 67a is formed of a stripline, a microstrip line, a coplanar guide line, or a high-impedance transmission line, all of the lines having a length slightly shorter than λ/4 when the wavelength of a high-frequency signal sent to this switch 61 is represented by λ. The transmission line 67a is grounded at the other end across a capacitor 68a. Moreover, a resistor 69a is connected at one end to the node between the transmission line 67a and the capacitor 68a and at the other end to a control voltage terminal VC1. The first port P61 is coupled across the capacitor 64 to a transmission line 71 which is constructed in a manner similar to the transmission line 67a. The other end of the transmission line 71 is grounded.

Additionally, connected to the first port P61 is the cathode of the diode 65b through the capacitor 64. The anode of the diode 65b is coupled to the third port P63 through a capacitor 66b. In a manner similar to the diode 65a, a series circuit of a transmission line 67b and a capacitor 68b is connected between the diode 65b and a ground potential. Also, a resistor 69b is coupled at one end to the node between the transmission line 69b and the capacitor 68b and at the other end to a control voltage terminal VC2.

In the high-frequency switch 61 constructed as described above, different control voltages can be applied to the control voltage terminals VC1 and VC2 so as to connect the first port P61 either to the second port P62 or to the third port P63. For example, by application of a positive control voltage to the control voltage terminal VC1 and a negative control voltage to the control voltage terminal VC2, a forward bias voltage can be applied to the diode 65a, while a reverse bias voltage can be applied to the diode 65b. Namely, since the capacitors 66a, 68a, 64, 66b and 68b interrupt the flow of direct current, the control current supplied from the control voltage terminal VC1 flows into a circuit portion including the transmission line 67a, the diode 65a and the transmission line 71, thereby causing the diode 65a to be activated. In contrast, the diode 65b is rendered to be ineffective since a reverse bias voltage is applied to the diode 65b.

Further, when a high-frequency signal is supplied from the second port P62, the transmission line 67a constructed as described above can be grounded at one end in a high-frequency band, and the impedance viewed from the node between the anode of the diode 65a and the capacitor 66a to the series circuit formed of the transmission line 67a and the capacitor 68a is caused to become infinite due to the impedance inversion of the wavelength λ/4. Accordingly, the high-frequency signal fed from the second port P62 flows into the first port P61.

Conversely, by application of a negative control voltage to the control voltage terminal VC1 and a positive control voltage to the control voltage terminal VC2, a reverse bias voltage can be applied to the diode 65a, while a forward bias voltage can be applied to the diode 65b. This causes the diode 65a to be rendered ineffective and the diode 65b to be activated. Thus, a signal flows between the first port P61 and the third port P63 rather than between the second port P62 and the first port P61. The impedance viewed from the node between the anode of the diode 65b and the capacitor 66b to the series circuit formed of the transmission line 67b and the capacitor 68b is also caused to become infinite, thereby preventing a high-frequency signal from flowing into the transmission line 67b.

The transmission lines 67a and 67b constitute current paths which allow a control current to flow into the diodes 65a and 65b, respectively. The lines 67a and 67b also function to enhance the impedance viewed from the node between the anode of the diode 65a and the capacitor 66a and the node between the anode of the diode 65b and the capacitor 66b to the transmission lines 67a and 67b and to reduce insertion losses and reflection losses.

As discussed above, in the high-frequency switch 61, by the application of a positive control voltage to one of the control voltage terminals VC1 and VC2 and a negative control voltage to the other terminal VC1 or VC2, the first port P61 can be connected either to the second port P62 or to the third port P63.

The switch circuit 51 shown in FIG. 7 can be constructed by using two of the afore-described high-frequency switches 61 as the switches 52 and 53. That is, the switch circuit 51 can be constructed by connecting the first ports of the three-port high-frequency switches 52 and 53 to each other.

Thus, by the use of the two switches 52 and 53 for this switch circuit 51, a high-frequency signal inevitably passes through the two switches 52 and 53. For example, a transmission output supplied from the transmitting end Tx passes through the two switches 52 and 53 until it reaches the antenna ANT. Similarly, a high-frequency signal input from the antenna ANT passes through the switches 52 and 53 and is output to the receiving end Rx. This inevitably increases insertion losses. Accordingly, the transmission output is required to be increased in the transmitting circuit Tx, and a decrease in gain is incurred in the receiving circuit Rx.

Additionally, since the switch circuit 51 is formed by using the two high-frequency switches 61 as the switches 52 and 53, it is necessary to apply control voltages to the two control voltage terminals of the switches 52 and 53. This entails the provision of two power sources for supplying control voltages. As a consequence, a complicated wiring pattern for providing the power sources must be formed on a circuit board.

SUMMARY OF THE INVENTION

Accordingly, it is an object of the present invention to provide a high-frequency switch requiring only a small number of component parts in which insertion losses can be inhibited and a wiring pattern for supplying control voltages can be simplified, free from the above-described problems.

In order to achieve the above object, there is provided a high-frequency switch comprising first through fourth ports wherein one of the first and second ports can be connected either to the third port or to the fourth port, and wherein first transmission lines are connected respectively between the first and third ports, the third and second ports, the second and fourth ports, and the fourth and first ports.

A diode may be connected between a reference potential and each of the first through fourth ports. Also, first through fourth control voltage terminals may be each connected between a reference potential and the diode.

Further, a transmission line may be connected in parallel to each diode and may be further connected at one end to a common node, and a fixed voltage terminal may be connected to the common node. At least one of the common node and the nodes between the reference potentials and the diodes connected to the respective first through fourth ports may be coupled via a resistor to one of the first through fourth control voltage terminals and the fixed voltage terminal.

Moreover, at least one of the first through fourth ports may be connected to the reference potential via a capacitor. Also, a resistor may be connected in parallel to at least one of the diodes.

Further, a series circuit formed of a transmission line and a capacitor may be connected in parallel to at least one of the diodes. Or, a series circuit formed of a transmission line and a capacitor may be connected in parallel to at least one of the diodes, and another capacitor may be further connected in parallel to the above series circuit.

With this arrangement, the first and third ports, the third and second ports, the second and fourth ports, and the fourth and first ports are connected by the transmission lines. The transmission lines form a ring-like circuit portion. The first, the third, the second and the fourth ports are connected along the periphery of the ring-like circuit portion in that order.

In operation, a respective one of the transmission lines connected between a corresponding pair of the first through fourth ports is activated so as to implement one of the following four connecting states: the first and the third ports are connected (the first connecting state); the first and the fourth ports are coupled (the second connecting state); the second and the third ports are connected (the third connecting state); and the second and the fourth ports are coupled (the fourth connecting state).

Other features and advantages of the present invention will become apparent from the following description of embodiments of the invention which refers to the accompanying drawings.

DESCRIPTION OF EMBODIMENTS OF THE INVENTION

Figure 1:
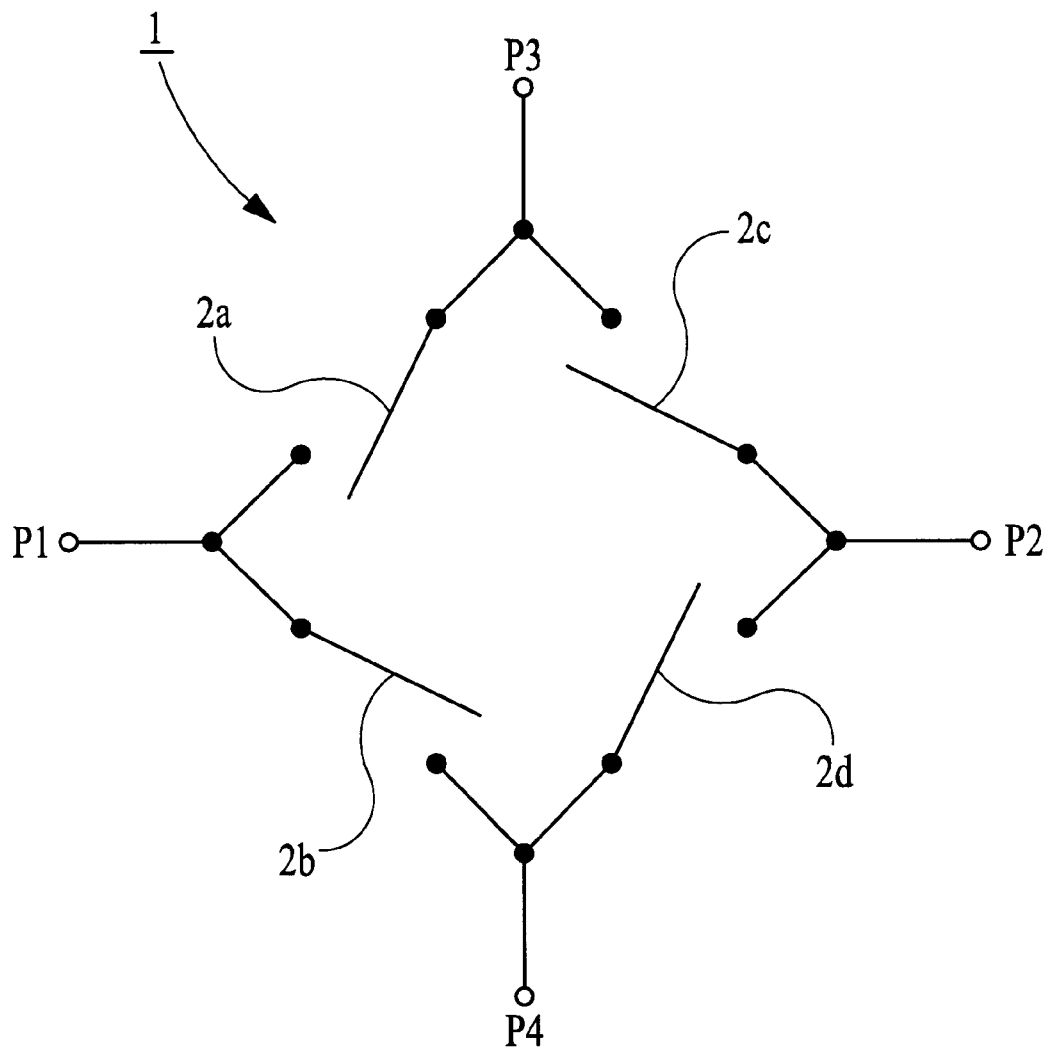
FIG. 1 is a schematic circuit diagram of the configuration of a first embodiment of a high-frequency switch according to the present invention.

Embodiments of the present invention will now be described with reference to the drawings. In the following description, the elements the same as or corresponding to those of a first embodiment are designated by like reference numerals, and a detailed explanation thereof will thus be omitted.

Figure 2:
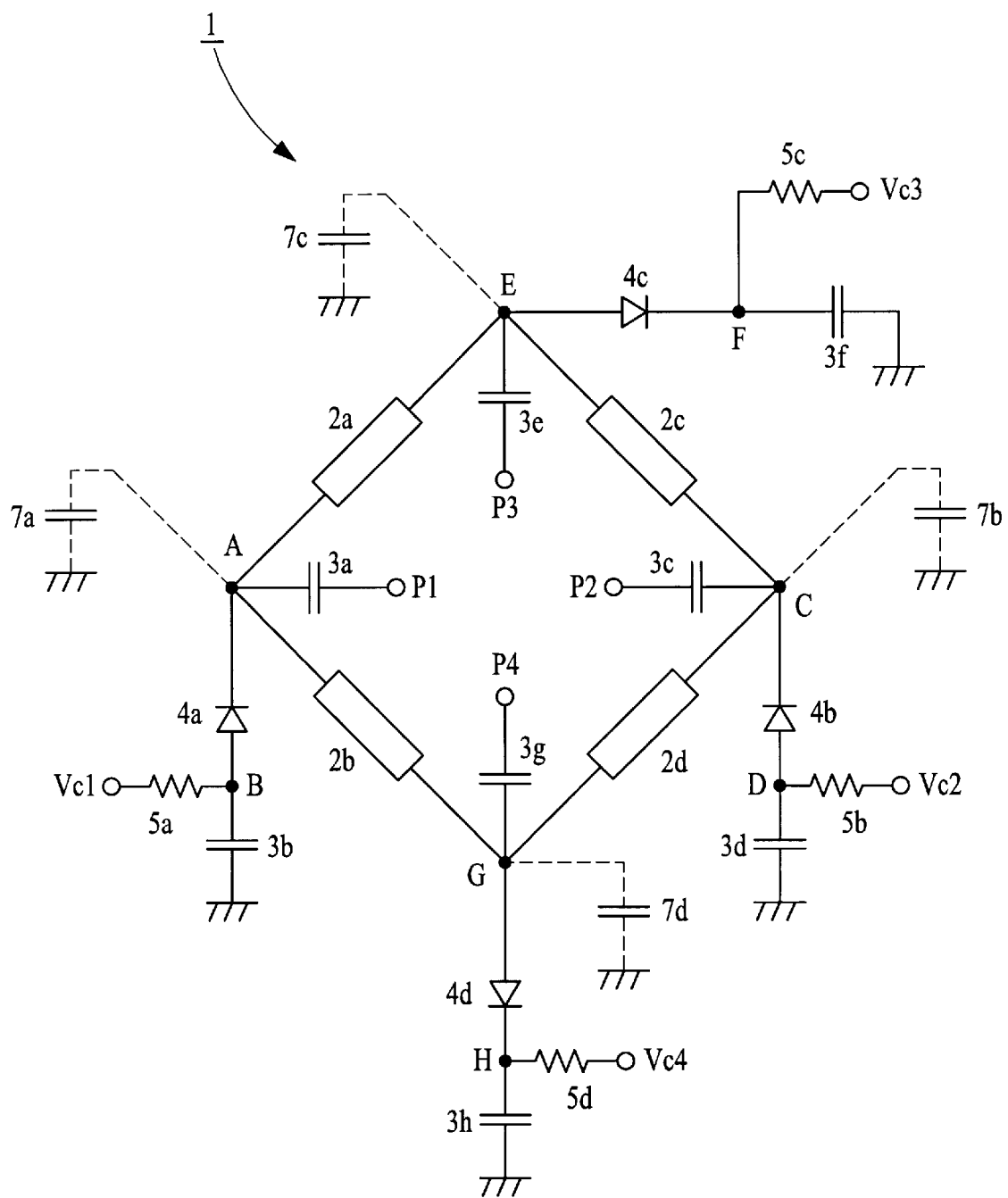
FIG. 2 is a detailed circuit diagram of the first embodiment of the present invention.

FIG. 1 is a schematic circuit diagram of a first embodiment of a high-frequency switch according to the present invention. A high-frequency switch generally indicated by 1 is a four-port high-frequency switch having four ports P1 through P4. As shown in FIG. 2, for the switching operation, first transmission lines 2a, 2b, 2c and 2d are respectively connected between the first and third ports P1 and P3, the first and fourth ports P1 and P4, the second and third ports P2 and P3, and the second and fourth ports P2 and P4. Namely, the first transmission lines 2a through 2d are linked.

Accordingly, first through fourth connecting states can be implemented in this high-frequency switch 1 to perform the switching operation. More specifically, in the first connecting state the first and third ports P1 and P3 are connected; in the second connecting state the first and fourth ports P1 and P4 are coupled; in the third connecting state the second and third ports P2 and P3 are connected; and in the fourth connecting state the second and fourth ports P2 and P4 are coupled.

Figure 7:
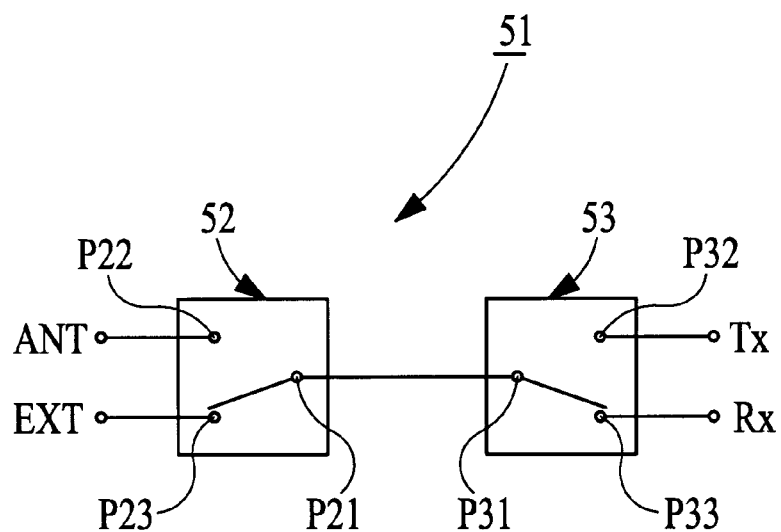
FIG. 7 is a schematic diagram of a high-frequency switch circuit of a known type.
Figure 8:
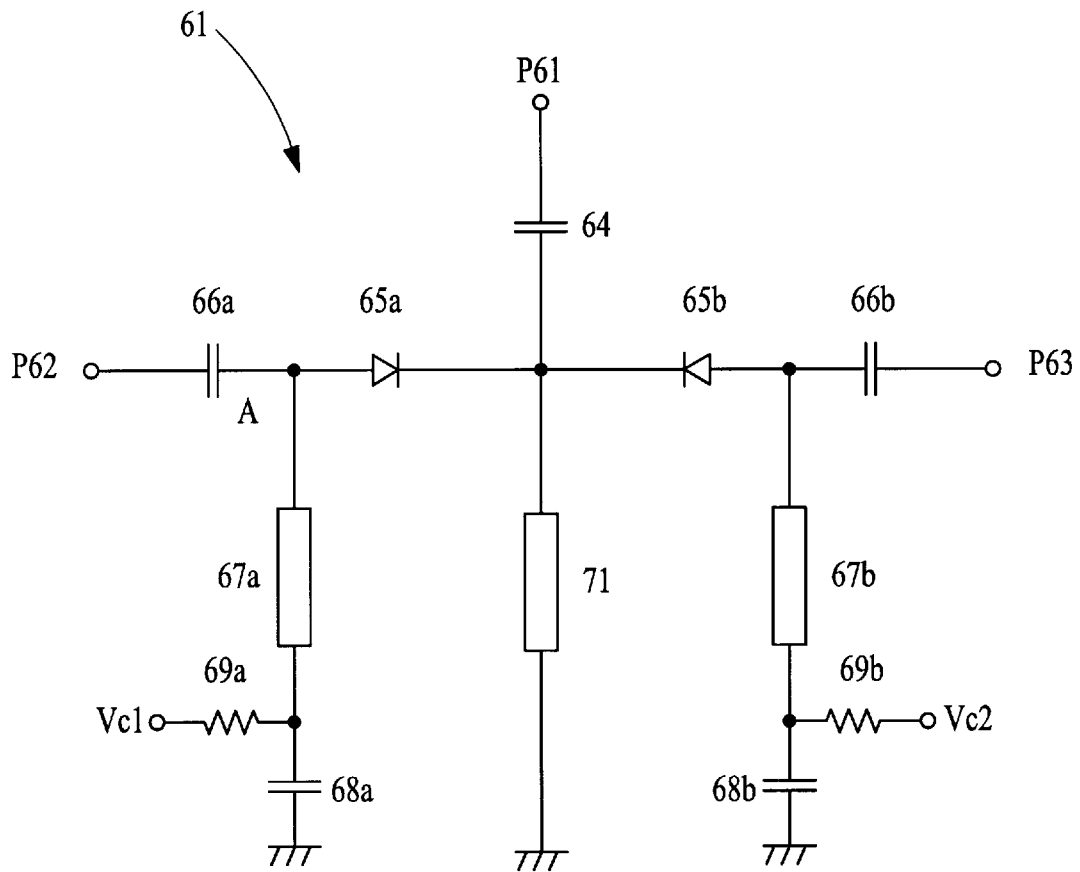
FIG. 8 is a circuit diagram of an example of a three-port high-frequency switch of a known type.

Therefore, the high-frequency switch 1 of this embodiment can be suitably used for the high-frequency switch circuit 51 illustrated in FIG. 7. Namely, it is only essential that any one of the following connecting states be implemented in the switch circuit 51: the state in which the transmitting end Tx is connected to the antenna ANT (for transmission); the state in which the transmitting end Tx is connected to the external terminal EXT (for transmission by connecting a second antenna to the external terminal EXT); the state in which the receiving end Rx is coupled to the antenna ANT (for reception); and the state in which the receiving end Rx is coupled to the external terminal EXT (for evaluating the performance of the receiving end Rx or for reception by connecting an external antenna to the external terminal EXT). The high-frequency switch 1 of this embodiment may be used as the high-frequency switch circuit 51 by connecting, for example, the first port P1 to the transmitting end Tx, the second port P2 to the receiving end Rx, and the third and fourth ports P3 and P4 to the antenna ANT and the external terminal EXT, respectively.

FIG. 2 is a detailed circuit diagram of the afore-described embodiment according to the present invention. As discussed above, the first transmission lines 2a through 2d are respectively connected between the first and third ports P1 and P3, the first and fourth ports P1 and P4, the second and third ports P2 and P3, and the second and fourth ports P2 and P4. Namely, the first transmission lines 2a through 2d can be linked as shown in FIG. 2.

In this circuit diagram, the first port P1 is connected through a capacitor 3a to the node A between the transmission lines 2a and 2b, and a diode 4a and a capacitor 3b are coupled in series with each other between the node A and a reference potential, i.e., a ground potential. A resistor 5a is connected at one end to the node B between the diode 4a and the capacitor 3b and at the other end to a first control voltage terminal Vc1.

Similarly, the second port P2 is connected through a capacitor 3c to the node C between the transmission lines 2c and 2d, and a diode 4b and a capacitor 3d are coupled in series with each other between the node C and a ground potential. A resistor 5b is connected at one end to the node D between the diode 4b and the capacitor 3d and at the other end to a second control voltage terminal Vc2.

Likewise, the third port P3 is connected via a capacitor 3e to the node E between the transmission lines 2a and 2c, and a diode 4c and a capacitor 3f are coupled in series with each other between the node E and a ground potential. A resistor 5c is connected at one end to the node F between the diode 4c and the capacitor 3f and at the other end to a third control voltage terminal Vc3.

Similarly, the fourth port P4 is connected via a capacitor 3g to the node G between the transmission lines 2b and 2d, and a diode 4d and a capacitor 3h are coupled in series to each other between the node G and a ground potential. A resistor 5d is connected at one end to the node H between the diode 4d and the capacitor 3h and at the other end to a fourth control voltage terminal Vc4.

In the above-described circuit configuration, the first transmission lines 2a through 2d are formed of striplines, microstrip lines, or coplanar guide lines, all of the lines having a length shorter than $\lambda/4$ when the wavelength of a high-frequency signal sent to the switch 1 is indicated by $\lambda$. The first and second transmission lines 2a through 2d are what is referred to as "$\lambda/4$ lines". In practice, however, the transmission lines 2a through 2d are configured to have a length shorter than $\lambda/4$ in consideration of the floating capacitance and the inductance of the striplines.

An explanation will now be given of the operation of the high-frequency switch 1. Table 1 shows the relationships between the directions of the diodes 4a through 4d, the control potentials at the first through fourth control voltage terminals VC1 through VC4, and the connecting states between the respective ports P1 through P4.

TABLE 1

| Connecting State | Activation | Vc1 | Vc2 | Vc3 | Vc4 | Directions of diodes |
|---|---|---|---|---|---|---|
| First | Between P1 and P3 | 0 | +Vcc | +Vcc | 0 | In the same directions as those shown in FIG. 2 |
| | | +Vcc | 0 | 0 | +Vcc | In the directions reverse to those of FIG. 2 |
| Second | Between P1 and P4 | 0 | +Vcc | 0 | +Vcc | In the same directions as those shown in FIG. 2 |
| | | +Vcc | 0 | +Vcc | 0 | In the directions reverse to those of FIG. 2 |
| Third | Between P2 and P3 | +Vcc | 0 | +Vcc | 0 | In the same directions as those shown in FIG. 2 |
| | | 0 | +Vcc | 0 | +Vcc | In the directions reverse to those of FIG. 2 |
| Fourth | Between P2 and P4 | +Vcc | 0 | 0 | +Vcc | In the same directions as those shown in FIG. 2 |
| | | 0 | +Vcc | +Vcc | 0 | In the directions reverse to those of FIG. 2 |

The implementation of the first connecting state will be explained below. A positive power supply voltage $+V_{cc}$ is applied to the second and third control voltage terminals Vc2 and Vc3, and the first and fourth control voltage terminals Vc1 and Vc4 are set to ground potential, i.e., 0 [V]. In this case, the control voltage applied from the second control voltage terminal Vc2 is dropped by the resistor 5b, and the resulting voltage is applied to the diode 4b as a forward bias voltage. Likewise, the same control voltage applied from the second control voltage terminal Vc2 is further dropped by the transmission line 2d, and the resulting voltage is applied to the diode 4d as a forward bias voltage. Thus, the diodes 4b and 4d can be activated, and the impedance of the series circuit of the diode 4b and the capacitor 3d and the impedance of the series circuit of the diode 4d and the capacitor 3h are caused to become zero at the operating frequency, so that the nodes C and G can be short-circuited to the ground potentials.

Meanwhile, the control voltage applied from the third control voltage terminal Vc3 is dropped by the resistor 5c, the diode 4c and the transmission line 2a, and the resulting voltage is applied to the diode 4a as a reverse-bias voltage. Similarly, the same control voltage applied from the third control voltage terminal Vc3 is also applied to the diode 4c as a reverse-bias voltage. This causes the diodes 4a and 4c to be ineffectual, and the capacitances of the series circuit of the diode 4a and the capacitor 3b and the series circuit of the diode 4c and the capacitor 3f can be maintained.

At this time, the transmission lines 2a through 2d are operated as an impedance inverting circuit at the operating frequency. Further, since the nodes C and G are short-circuited to the ground potential, the impedances viewed from the nodes A and E to the transmission lines 2b and 2c, respectively, become infinite. Hence, the nodes A and E can be connected, while the nodes C and G can be short-circuited to the ground potential. An electrical connection is thus established only between the first and third ports P1 and P3.

The second through fourth connecting states can be implemented by applying the control voltages as indicated in Table 1 to the first through fourth control voltage terminals Vc1 through Vc4.

According to the above description, the high-frequency switch 1 of the first embodiment is a four-port high-frequency switch.

In this switch, a high-frequency signal applied between a pair of ports is supplied to only one transmission line connected to this pair of ports. This can reduce insertion losses to one-half of the losses of the three-port high-frequency switches of the known type in which a high-frequency signal inevitably passes through two diodes, and the life of the devices used in the switch of this embodiment can also be prolonged. Additionally, if this switch is applied to, for example, a cellular telephone, the battery's life can be prolonged to provide more hours of conversation time and stand-by time.

Moreover, the connecting state of the first port to the third and fourth ports is symmetrical to that of the second port. Therefore, this switch can be suitably used for a diversity antenna switch and the like.

Further, the switch can be operated with two terminals among the first through fourth control voltage terminals grounded. Accordingly, it is only essential that one type of voltage, for example, a positive or negative power supply voltage, be supplied. This can simplify the wiring pattern of a printed circuit board on which this high-frequency switch is mounted. It is thus possible to significantly downsize electronic equipment integrating this type of switch. Additionally, the switch is constructed in such a manner that two diodes are inserted into one bias circuit, thereby decreasing current consumption.

Figure 3:
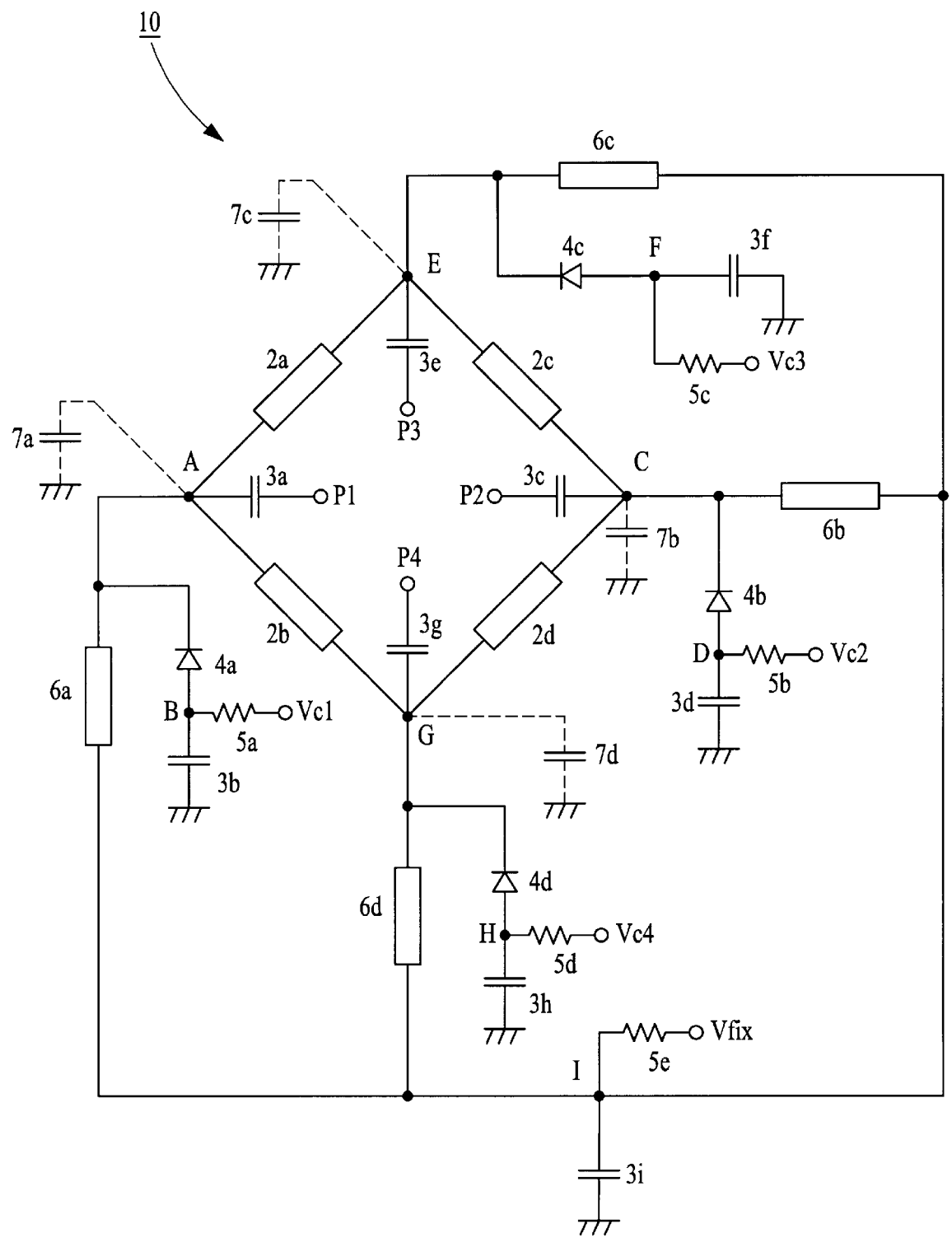
FIG. 3 is a detailed circuit diagram of a second embodiment of the present invention.

FIG. 3 is a circuit diagram of a second embodiment of a high-frequency switch according to the present invention. The high-frequency switch generally designated by 10 is different from the switch 1 of the first embodiment in the following points. Second transmission lines 6a through 6d are connected in parallel to the diodes 4a through 4d, respectively. Further one end of a resistor 5e and one end of a capacitor 3i are connected to a common node I between a ground potential and one end of each of the second transmission lines 6a through 6d. The resistor 5e is connected at the other end to a fixed voltage terminal Vfix, while the capacitor 3i is grounded at the other end.

In the above-described circuit configuration, the first transmission lines 2a through 2d and the second transmission lines 6a through 6d are formed of striplines, microstrip lines, or coplanar guide lines, all of the lines having a length shorter than $\lambda/4$ when the wavelength of a high-frequency signal sent to the switch 10 is indicated by $\lambda$. The first and second transmission lines 2a through 2d and 6a through 6d are what is referred to as "$\lambda/4$ lines". In practice, however, the transmission lines 2a through 2d and 6a through 6d are configured to have a length shorter than $\lambda/4$ in consideration of the floating capacitance and the inductance of the lines.

An explanation will now be given of the operation of the high-frequency switch 10. Table 2 shows the relationships between the directions of the diodes 4a through 4d, the control voltages of the first through fourth control voltage terminals Vc1 through Vc4 and the control voltage of the fixed voltage terminal Vfix, and the connection states between the respective ports P1 through P4.

TABLE 2

| Connecting State | Activation | Vc1 | Vc2 | Vc3 | Vc4 | Vfix | Directions of diodes |
|---|---|---|---|---|---|---|---|
| First | Between P1 and P3 | 0 | +Vcc | 0 | +Vcc | 0 | In the same directions as those shown in FIG. 3 |
|  |  | +Vcc | 0 | +Vcc | 0 | +Vcc | In the directions reverse to those of FIG. 3 |
| Second | Between P1 and P4 | 0 | +Vcc | +Vcc | 0 | 0 | In the same directions as those shown in FIG. 3 |
|  |  | +Vcc | 0 | 0 | +Vcc | +Vcc | In the directions reverse to those of FIG. 3 |
| Third | Between P2 and P3 | +Vcc | 0 | 0 | +Vcc | 0 | In the same directions as those shown in FIG. 3 |
|  |  | 0 | +Vcc | +Vcc | 0 | +Vcc | In the directions reverse to those of FIG. 3 |
| Fourth | Between P2 and P4 | +Vcc | 0 | +Vcc | 0 | 0 | In the same directions as those shown in FIG. 3 |
|  |  | 0 | +Vcc | 0 | +Vcc | +Vcc | In the directions reverse to those of FIG. 3 |

The implementation of the first connecting state will be explained below. A positive power supply voltage $+V_{cc}$ is applied to the second and fourth control voltage terminals Vc2 and Vc4, and the first and third control voltage terminals Vc1 and Vc3 and the fixed voltage terminal Vfix are set to ground potential, i.e., 0 [V]. In this case, the control voltage applied from the second control voltage terminal Vc2 is dropped by the resistors 5b and 5e, and the resulting voltage is applied to the diode 4b as a forward bias voltage. Likewise, the control voltage applied from the fourth control voltage terminal Vc4 is dropped by the resistors 5d and 5e, and the resulting voltage is applied to the diode 4d as a forward bias voltage. Thus, the diodes 4b and 4d can be activated, and the impedance of the series circuit of the diode 4b and the capacitor 3d and the impedance of the series circuit of the diode 4d and the capacitor 3h are caused to become zero at the operating frequency, so that the nodes C and G can be short-circuited to the ground potential.

In contrast, the node I is connected to the fixed voltage terminal Vfix via the resistor 5e. Accordingly, a reverse bias voltage is applied to the diode 4a by an amount of the voltage drop developed across the resistor 5e. A reverse bias voltage is also applied to the diode 4c by an amount of the voltage drop developed across the resistor 5c. The diodes 4a and 4c are thus rendered to be ineffectual, thereby making it possible to maintain the capacitance of the series circuit of the diode 4a and the capacitor 3b and the capacitance of the series circuit of the diode 4c and the capacitor 3f.

In the above connecting state, the first and second transmission lines 2a through 2d and 6a through 6d are designed to be operated as an impedance inverting circuit at the operating frequency. Further, since the nodes C and G are short-circuited to the ground potential, the impedance viewed from the node A to the first and second transmission lines 2b and 6a and the impedance viewed from the node E to the first and second transmission lines 2c and 6c are caused to become infinite. Consequently, the nodes A and E are connected, while the nodes C and G are short-circuited to the ground potential, so that an electrical connection is established only between the first and third ports P1 and P3.

The second through fourth connecting states can be realized by applying the control voltages as indicated in Table 2 to the first through fourth control voltage terminals Vc1 through Vc4.

According to the above description, the high-frequency switch 10 of the second embodiment is a four-port high-frequency switch.

Also, in this switch, a high-frequency signal applied between a pair of ports is supplied to only one transmission line connected to this pair of ports. This can reduce insertion losses to one-half of the losses of the pair of three-port high-frequency switches of the known type in which a high-frequency signal inevitably passes through two diodes, and the life of the devices used in the switch of this embodiment can also be prolonged. Additionally, if this switch is applied to, for example, a cellular telephone, the battery's life can be prolonged to enable longer conversation time and stand-by time.

Moreover, the connecting state of the first port to the third and fourth ports is symmetrical to that of the second port. Therefore, this switch can be suitably used for a diversity antenna switch and the like.

Further, in operation of this switch, two terminals among the first through fourth control voltage terminals can be grounded. Accordingly, it is only essential that one type of voltage, for example, a positive or negative power supply voltage, be supplied. This can simplify the wiring pattern of a printed circuit board on which this high-frequency switch is mounted. It is thus possible to significantly downsize electronic equipment integrating this type of switch.

It should be noted that a ground potential may be applied instead of a positive power supply voltage $+V_{cc}$, and a negative power supply voltage $-V_{cc}$ may be applied in place of a ground potential. In this case, in the first connecting state of the high-frequency switch 1, the second and third control voltage terminals Vc2 and Vc3 are grounded, and a negative power supply voltage $-V_{cc}$ is applied to the first and fourth control voltage terminals Vc1 and Vc4. The same applies to the implementations of the second through fourth connecting states of the high-frequency switch 1 and the first through fourth connecting states of the switch 10.

Further, although in the above first and second embodiments the diodes 4a through 4d are connected in the directions shown in FIGS. 2 and 3, they may be reversed. More specifically, in the first embodiment, the diodes 4a through 4d may be connected in such a manner that the anodes of the diodes 4a through 4d are respectively coupled to the nodes A, C, F and H, while the cathodes of the diodes 4a through 4d are respectively coupled to the nodes B, D, E and G. In the second embodiment, the diodes 4a through 4d may be connected in such a manner that the anodes of the diodes 4a through 4d are respectively coupled to the nodes A, C, E and G, while the cathodes of the diodes 4a through 4d are respectively coupled to the nodes B, D, F and H. In this case, the polarities of the respective diodes are reverse to those of the first and second embodiments shown in FIGS. 2 and 3, and thus, the control voltages to be applied to the first through fourth control voltage terminals Vc1 through Vc4 and the fixed voltage terminal Vfix are different, as shown in Tables 1 and 2.

The resistors 5a through 5e, in some cases, may not be necessary, since they are provided simply for the purpose of adjusting the control voltages supplied from the corresponding first through fourth control voltage terminals Vc1 through Vc4 and the fixed voltage terminal Vfix to the high-frequency switch 1 or 10 through the nodes B, D, F, H and I. In such a case, the nodes B, D, F, H and I are directly coupled to the first through fourth control voltage terminals Vc1 through Vc4 and the fixed voltage terminal Vfix, respectively. Also, the transmission lines 6a through 6d may be replaced by high-impedance lines. Additionally, the capacitors 3a through 3i serve to interrupt the flow of direct current, and in some cases, they may also be omitted.

A first example of a modification of the high-frequency switches 1 and 10 will now be described. As indicated by the broken lines in FIGS. 2 and 3, capacitors 7a through 7d may be coupled between a reference potential and the respective first through fourth ports P1 through P4. In this case, the capacitances of the capacitors 7a through 7d can be determined to correct the characteristic impedance, thereby effectively reducing the insertion losses and reflection losses of the switches 1 and 10. Additionally, the transmission lines 2a through 2d and 6a through 6d can be shortened, thereby making it possible to downsize the switches 1 and 10. All of the above-described capacitors 7a through 7d are not necessarily used, and only some of them may be connected.

Figure 4:
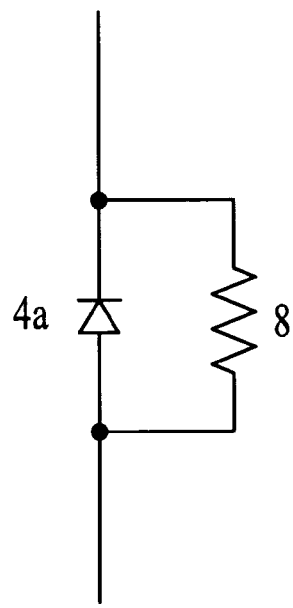
FIG. 4 is a circuit diagram illustrating a second example of a modification of a high-frequency switch.
Figure 5:
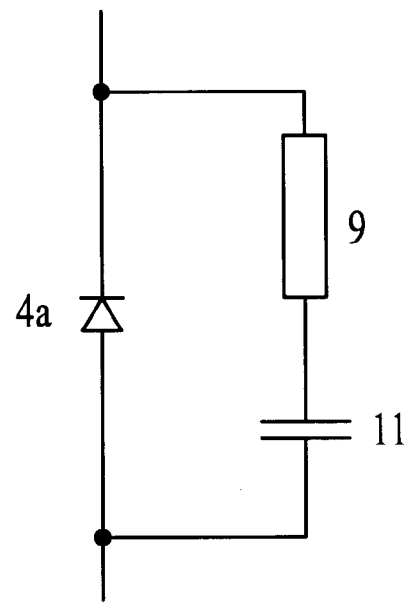
FIG. 5 is a circuit diagram illustrating a third example of a modification of a high-frequency switch.
Figure 6:
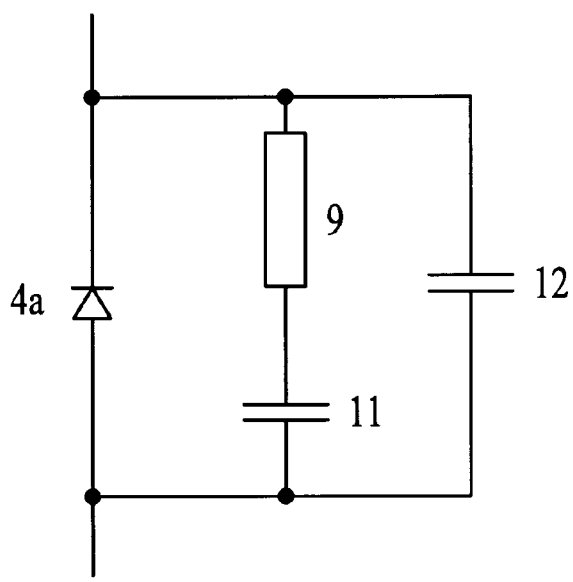
FIG. 6 is a circuit diagram illustrating a fourth example of a modification of a high-frequency switch.

An explanation will further be given with reference to FIGS. 4 through 6 of second through fourth examples of modifications of the high-frequency switches 1 and 10 of the above embodiments. In these examples, an additional circuit device is connected to a certain diode selected from the diodes 4a through 4d. An explanation will be given of a circuit coupled to, for example, the diode 4a, with reference to FIGS. 4 through 6.

In the second example shown in FIG. 4, a resistor 8 is coupled in parallel to the diode 4a. The diode 4a, when it is in the inactivated state, serves as a capacitor for blocking direct current. When the diode 4a is activated, charges accumulated in the diode 4a start to flow. In the configuration illustrated in FIG. 4, charges accumulated in diode 4a are discharged via the resistor 8, thereby enhancing the smooth switching operation of the diode 4a from the off state to the on state. Additionally, reverse biasing of the inactivated diode 4a can be stabilized.

Moreover, in the third example of a modification illustrated in FIG. 5, a series circuit of a transmission line 9 and a capacitor 11 is connected in parallel to the diode 4a. In this configuration, a parallel resonance circuit can be formed due to the capacitance generated when the diode 4a is turned off, and the inductance of the transmission line 9. Hence, the inductance of the transmission line 9 can be regulated to match the resonant frequency of this parallel resonance circuit to the frequency of a high-frequency signal to be transmitted to the switch 1 or 10, thereby enhancing the impedance of the de-energized diode 4a. As a consequence, the isolation characteristics of the inactivated diode 4a can be improved.

The capacitor 11 is provided to prevent the bypassing of a direct current flowing via the transmission line 9. The transmission line 9 is formed of a stripline, a microstrip line, a coplanar guide line or the like, and the length and the impedance of the line 9 are determined so that the frequency of the parallel resonance circuit can match the frequency of a transmitting high-frequency signal.

Further, if the capacitance of the inactivated diode 4a is too small to obtain a desired resonant frequency, a fourth example of a modification is provided. That is, as shown in FIG. 6, a further capacitor 12 is connected in parallel to the series circuit formed of the transmission line 9 and the capacitor 11 coupled in parallel to the diode 4a. With this configuration, a parallel resonance circuit can be formed by a combined capacitance of the inactivated diode 4a and the capacitor 12 and an inductance of the transmission line 9, thereby obtaining a desired resonant frequency.

The first through fourth examples of modifications can be combined with each other.

As will be clearly understood from the foregoing description, the high-frequency switch of the present invention offers the following advantages.

A four-port high-frequency switch can be constructed. Also, a high-frequency signal applied between a pair of ports is supplied to only one transmission line connected to this pair of ports. This can reduce insertion losses to one-half of those of a known type of a three-port switch circuit in which a high-frequency signal unavoidably passes through two diodes, and the life of the devices used in the switch of this invention can also be prolonged. Additionally, if this switch is applied to, for example, a cellular telephone, the battery's life can be prolonged to enable longer conversation time and stand-by time.

Moreover, the connecting state of the first port to the third and fourth ports is symmetrical to that of the second port. Therefore, this switch can be suitably used for a diversity antenna switch and the like.

Further, the switch can be operated with two terminals among the first through fourth control voltage terminals and the fixed voltage terminal grounded. Accordingly, it is only essential that one type of voltage, for example, a positive or negative power supply voltage, be supplied. This can simplify the wiring pattern of a printed circuit board on which this high-frequency switch is mounted. It is thus possible to significantly downsize electronic equipment integrating this type of switch. Also, this switch is constructed in such a manner that two diodes are inserted into one bias circuit, thereby decreasing current consumption.

Additionally, the control voltages and the control current can be readily adjusted by the resistances of the resistors. Also, the capacitances of the capacitors can be determined to correct the characteristic impedance, thereby effectively reducing insertion losses and reflection losses. If transmission lines are connected in parallel to the diodes, they can be shortened, thereby downsizing the high-frequency switch.

To further develop the present invention, if an extra resistor is connected in parallel to a diode, charges are accumulated in the inactivated diode serving as a capacitor. When the diode is activated, the charges are discharged through the resistor. Hence, with this construction, the smooth switching operation of the diode from the off state to the on state can be enhanced, and the diode can be stably reverse-biased when it is in the off state.

If a series circuit of an extra transmission line and an extra capacitor are connected to a diode, a parallel resonance circuit can be formed by a capacitance of the de-energized capacitor and an inductance of the transmission line. The resonant frequency of the parallel resonance circuit can be determined to match the frequency of a high-frequency signal to be transmitted to the switch, thereby increasing the impedance of the inactivated diode and further enhancing isolation characteristics. Additionally, the capacitor can prevent the bypassing of a direct current to a circuit portion including the transmission line.

If an extra capacitor is further connected to the above-described series circuit of a transmission line and a capacitor, a parallel resonance circuit can be formed by a combined capacitance of the inactivated diode and the capacitor connected in parallel to the diode and an inductance of the transmission line. Thus, it is possible to obtain a desired resonant frequency, thereby enhancing isolation characteristics.

Although the present invention has been described in relation to particular embodiments thereof, many other variations and modifications and other uses will become apparent to those skilled in the art. Therefore, the present invention is not limited by the specific disclosure herein.

What is claimed is:

1. A high-frequency switch comprising:
   first through fourth signal input-output ports, wherein each one of the first and second ports can be connected selectively to the third port and to the fourth port,
   first transmission lines which are connected respectively between the first and third ports, the third and second ports, the second and fourth ports, and the fourth and first ports,
   first through fourth diodes each having two ends, each diode being connected at one end to a reference potential and at the other end to a respective one of the first through fourth ports, and
   first through fourth control voltage terminals which are connected respectively to said other ends of said first through fourth diodes.

2. A high-frequency switch according to claim 1, wherein a respective second transmission line is connected in parallel to each said diode and is further connected at one end to a common node, and a fixed voltage terminal is connected to said common node.

3. A high-frequency switch according to either one of claims 1 and 2, wherein a resistor is connected between at least one of said common node and nodes between the reference potentials and said diodes, and the corresponding one of said first through fourth control voltage terminals and said fixed voltage terminal.

4. A high-frequency switch according to either one of claims 1 and 2, wherein at least one of the first through fourth ports is connected to the reference potential via a capacitor.

5. A high-frequency switch according to either one of claims 1 and 2, further comprising a resistor connected in parallel to at least one of said diodes.

6. A high-frequency switch according to either one of claims 1 and 2, wherein a series circuit formed of a transmission line and a capacitor is connected in parallel to at least one of said diodes.

7. A high-frequency switch according to either one of claims 1 and 2, wherein a series circuit formed of a transmission line and a capacitor is connected in parallel to at least one of said diodes, and another capacitor is further connected in parallel to said series circuit.

* * * * *